US011195181B2

(12) United States Patent
Geslain et al.

(10) Patent No.: US 11,195,181 B2
(45) Date of Patent: Dec. 7, 2021

(54) METHOD AND DEVICE FOR PARAMETERISING A DEVICE FOR PERFORMING BANKING OPERATIONS

(71) Applicant: SAFRAN IDENTITY & SECURITY, Issy les Moulineaux (FR)

(72) Inventors: Raphaël Geslain, Issy les Moulineaux (FR); Cyrille Pepin, Issy les Moulineaux (FR); David Daille-Lefevre, Issy les Moulineaux (FR)

(73) Assignee: SAFRAN IDENTITY & SECURITY, Issy les Moulineaux (FR)

( * ) Notice: Subject to any disclaimer, the term of this patent is extended or adjusted under 35 U.S.C. 154(b) by 361 days.

(21) Appl. No.: 15/432,273

(22) Filed: Feb. 14, 2017

(65) Prior Publication Data

US 2017/0236126 A1 Aug. 17, 2017

(30) Foreign Application Priority Data

Feb. 17, 2016 (FR) ...................................... 16/51276

(51) Int. Cl.
*G06Q 20/40* (2012.01)
*G06F 21/32* (2013.01)
(Continued)

(52) U.S. Cl.
CPC ....... *G06Q 20/40145* (2013.01); *G06F 21/32* (2013.01); *G06Q 20/1085* (2013.01);
(Continued)

(58) Field of Classification Search
CPC .. G06Q 20/341; G06Q 20/227; G06Q 20/322; G06Q 20/34; G06Q 20/3437;
(Continued)

(56) References Cited

U.S. PATENT DOCUMENTS 9,519,901 B1 * 12/2016 Dorogusker ......... G06Q 20/202
2011/0140841 A1 * 6/2011 Bona ................ G06K 19/06187
340/5.83
2015/0127553 A1 * 5/2015 Sundaram .......... G06K 19/0716
705/72

FOREIGN PATENT DOCUMENTS

FR 3 011 111 A1 3/2015
WO 2010/022129 A1 2/2010
WO 2013/183061 A1 12/2013

OTHER PUBLICATIONS

Sep. 19, 2016 Search Report issued in French Patent Application No. 1651276.
(Continued)

*Primary Examiner* — Thien M Le
*Assistant Examiner* — Tae W Kim
(74) *Attorney, Agent, or Firm* — Oliff PLC; R. Brian Drozd

(57) ABSTRACT

A method for parameterising a device for performing banking operations in which biometric data of the holder of the device for performing banking operations are used to authenticate the user of the device. The present invention: activates a plurality of commands using identifiers of a standard relating to banking transactions available for effecting commands not predefined by the standard; creates, from an identifier of the standard relating to banking transactions available for effecting commands not predefined by the standard, in the device for performing banking operations, a container able to store reference biometric data of a user of the device for performing banking operations; and stores reference biometric data, using an identifier of the standard relating to banking transactions available for effecting commands not predefined by the standard, in the container of reference biometric data of the user of the device for performing banking operations.

11 Claims, 6 Drawing Sheets

(51) Int. Cl.
*G06Q 20/34* (2012.01)
*G06Q 20/10* (2012.01)
*G06Q 40/02* (2012.01)
*G07F 7/10* (2006.01)
*G07F 19/00* (2006.01)

(52) U.S. Cl.
CPC ......... *G06Q 20/34* (2013.01); *G06Q 20/4012* (2013.01); *G06Q 40/02* (2013.01); *G07F 7/1008* (2013.01); *G07F 19/00* (2013.01)

(58) Field of Classification Search
CPC ............. G06Q 20/352; G06Q 20/3563; G06Q 20/3572; G06Q 20/3574; G06Q 20/4012; G06Q 20/40145; G06Q 20/4018; G06Q 30/0233; G06Q 30/0255; G06K 19/06187; G06K 19/06196; G06K 19/07; G06K 19/0702; G06K 19/0716; G06K 19/0718; G06K 19/0719; G06K 19/0723; G06K 19/07703; G07F 7/0846
USPC ........................................................ 235/379
See application file for complete search history.

(56) References Cited

OTHER PUBLICATIONS

Sep. 19, 2016 Written Opinion issued in French Patent Application No. 1651276.

\* cited by examiner

METHOD AND DEVICE FOR PARAMETERISING A DEVICE FOR PERFORMING BANKING OPERATIONS

The present invention relates to a method and device for parameterising a device for performing banking operations in which the biometric data of the user of the device for performing banking operations are used to authenticate the user of the device for performing banking operations.

At the present time, in the field of protected elements, it is possible to allow the storage and then the verification of biometric data for authentication purposes for giving access to various rights, in particular in the field of crossing frontiers.

The biometric data are for example at least a fingerprint and/or data representing facial and/or iris recognition and/or voice print characteristics.

However, there does not at the present time exist any means used in a protected element to allow such biometric operations for purposes of banking transactions or operations; in particular there does not exist any biometric authentication means that is moreover fully compatible with the standards applied to payment cards, such as the EMV standard.

EMV is an international standard for debit or credit chip cards initiated by the EMVCo consortium. It provides a much higher level of security compared with swipe cards, and is inspired greatly by the original chip card.

At the present time, the methods for authenticating the bearer of a device for performing banking operations, such as a bank card, are based on a confidential-code system. In the event of loss or indeed theft of the card, when a third party has been able to obtain the confidential code of the bank card, he can at his leisure substitute himself for the original holder of the payment means.

The original bearer or user, for example in the case of a bank card, is the customer to whom the bank issues the card after its personalisation, along with a confidential code such as a PIN code.

The confidential code contains four to twelve figures, is personalised in the data relating to the application present in the chip card and is communicated to the user of said chip card in order to be authenticated with the card.

Third parties always have a chance, out of the total number of different combinations of code, of finding the correct one by chance, that is to say one chance out of ten thousand when the PIN is composed of four figures.

The purpose of the present invention is to solve the drawbacks of the prior art by proposing a method and device for performing banking operations that guarantee to the user that he alone will be capable of authenticating himself with the device for performing banking operations so as to allow a banking transaction. In addition, the present invention aims to introduce, to a device for performing banking operations, biometric authentication means that remain compatible with the standards of the sector, in particular the EMV standard.

To this end, according to a first aspect, the invention proposes a method for the parameterising and use of a device for performing banking operations in which biometric data of the user of the device for performing banking operations are used to authenticate the user of the device for performing banking operations, characterised in that the method comprises the steps of:

activating a plurality of commands using identifiers of a standard relating to banking transactions available for effecting commands not predefined by the standard, creating, using an identifier of the standard relating to banking transactions available for effecting commands not predefined by the standard, in the device for performing banking operations, a container able to store reference biometric data of a user of the device for performing banking operations, storing reference biometric data, using an identifier of the standard relating to banking transactions available for effecting commands not predefined by the standard, in the container of reference biometric data of the user of the device for performing banking operations.

The present invention also relates to a device for performing banking operations in which the biometric data of the holder of the device for performing banking operations are used to authenticate the user of the device for performing banking operations, characterised in that the device comprises:

means for activating a plurality of commands using identifiers of a standard relating to banking transactions available for effecting commands not predefined by the standard, means for creating, using an identifier of the standard relating to banking transactions available for effecting commands not predefined by the standard, in the device for performing banking operations, a container able to store reference biometric data of a user of the device for performing banking operations, means for storing reference biometric data, using an identifier of the standard relating to banking transactions available for effecting commands not predefined by the standard, in the container of reference biometric data of the user of the device for performing banking operations.

Thus the authentication of the user of the device for performing banking operations in order to authorise a banking transaction is more reliable.

In addition, the device for performing banking operations according to the present invention remains compatible with the standards of the sector, in particular the EMV standard.

According to a particular embodiment of the invention, the method further comprises, prior to the activation, creation and storage steps, the step of activation or not, in the device for performing banking operations, the biometric data functionality for authenticating the user of the device for performing banking operations.

Thus the design of the device for performing banking operations makes it possible to use it in a conventional authentication system with a confidential code or in a system in which the present invention is implemented.

According to a particular embodiment of the invention, the method further comprises the steps of:

receiving candidate biometric data for a banking operation, comparing the candidate biometric data with the reference biometric data, authorising or rejecting the banking transaction according to the comparison.

According to a particular embodiment of the invention, the method further comprises the step of storing, in the device for performing banking operations, instructions able to process at least one of the following commands: verification of biometric data without enciphering, verification of biometric data with enciphering, unblocking an error counter, reading an error counter.

Thus the user of the device can be authenticated according to various methods at the choice of the issuer of the device, and an error counter can be added to the container in order to monitor the change in the number of erroneous candidate biometric data compared with the reference biometric data.

According to a particular embodiment of the invention, the method further comprises the step of storing, in the device for performing banking operations, instructions able to process the recording of biometric data subsequently to the supply of the device for performing banking operations to its user.

Thus it is possible for the user, with the device for performing banking operations in his possession, to record the biometric data of his choice in the device for performing banking operations, and this in a secure environment.

According to a particular embodiment of the invention, in the case of rejection of the banking transaction, the method further comprises the steps of incrementing a rejection counter.

Thus it is possible, according to this particular embodiment of the invention, to monitor the change in the number of erroneous candidate biometric data compared with the reference biometric data.

According to a particular embodiment of the invention, the method further comprises the steps of comparing the value of the rejection counter with a predetermined value and, if the value of the rejection counter is equal to the predetermined value, selecting another method for authenticating the user of the device and, where applicable, rejecting any banking operation as long as an updating of the rejection counter is not made.

Thus the correct use of the device for performing banking operations complying with this particular embodiment of the invention is dependent on the presentation of valid candidate biometric data, and presenting a predetermined limit value of invalid candidate data blocks this method of authenticating the bearer of the device for performing banking operations.

According to a particular embodiment of the invention, when the rejection counter is updated, the method further comprises the step of updating in the container new reference biometric data of the user of the device for performing banking operations.

Thus it is possible to reintroduce reference biometric data in a secure environment, in order to enable the holder of the device to store biometric data that enable him to authenticate himself, if by chance the previous reference biometric data were incorrectly entered.

According to a particular embodiment of the invention, if the functionality is not activated, the method comprises the steps of:
receiving a candidate authentication code for a banking operation,
comparing the candidate authentication code with a reference code stored in the device for performing banking operations,
authorising or rejecting the banking transaction according to the comparison of the candidate authentication code with the reference code.

Thus, if the functionality is not activated in the device for performing banking operations, said device for performing banking operations matches the standards governing the technological environment of said device for performing banking operations.

According to a particular embodiment of the invention, the device for performing banking operations is a chip card or is included in a mobile telephone.

Thus the user of said chip card is capable of authenticating himself with said chip card during each banking transaction by means of his candidate biometric data.

The invention also relates to the computer programs stored on an information carrier, said programs containing instructions for implementing the previously described methods, when they are loaded into and executed by a computer system.

The features of the invention mentioned above, as well as others, will emerge more clearly from a reading of the following description of an example embodiment, said description being given in relation to the accompanying drawings, among which:

Figure 1:
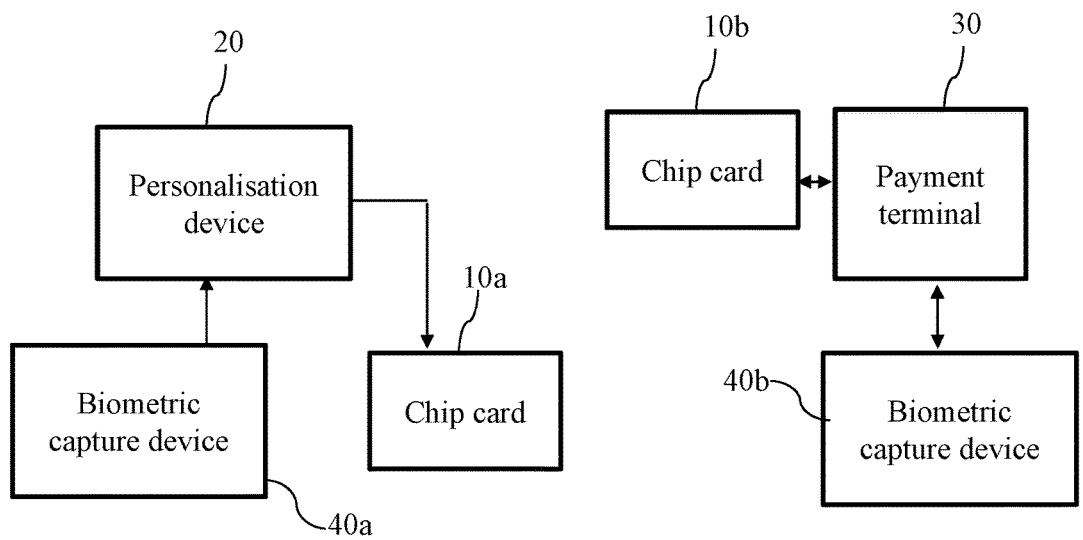
FIG. 1 shows a system for parameterising and/or using a device for performing banking operations in which the biometric data of the holder of the device for performing banking operations are used for authorising or rejecting a payment according to the present invention.

The system for parameterising and/or using a device for performing banking operations 10a or 10b, in which the biometric data of the holder or user of the device for performing banking operations are used, comprises at least one personalisation device 20, devices for performing banking operations 10a, 10b, devices for capturing biometric data 40 of the holder of the device for performing banking operations 10, payment terminals 30 and/or cash points or terminals for performing banking operations not shown in FIG. 1.

The personalisation device 20 is for example included, according to a first embodiment of the present invention, in a banking establishment or an establishment supplying devices for performing banking operations 10.

The personalisation device 20 is for example placed, according to a second embodiment of the present invention, at the counter of bank branches of a banking establishment.

The devices 40a and 40b for capturing biometric data are for example placed, according to the present invention, at the counter of bank branches for the device 40a for capturing biometric data or for example in a sales outlet for the device 40b for capturing biometric data.

According to the present invention, the device for performing banking operations 10 comprises:

means for activating a plurality of commands using identifiers of a standard relating to banking transactions available for effecting commands not predefined by the standard, means for creating, on the basis of an identifier of a standard relating to banking transaction available for effecting commands not predefined by the standard, in the device for performing banking operations, a container able to store reference biometric data of a user of the device for performing banking operations, means for storing reference biometric data, on the basis of an identifier of the standard relating to banking transactions available for effecting commands not predefined by the standard, in the container of reference biometric data of the user of the device for performing banking operations.

Figure 2:
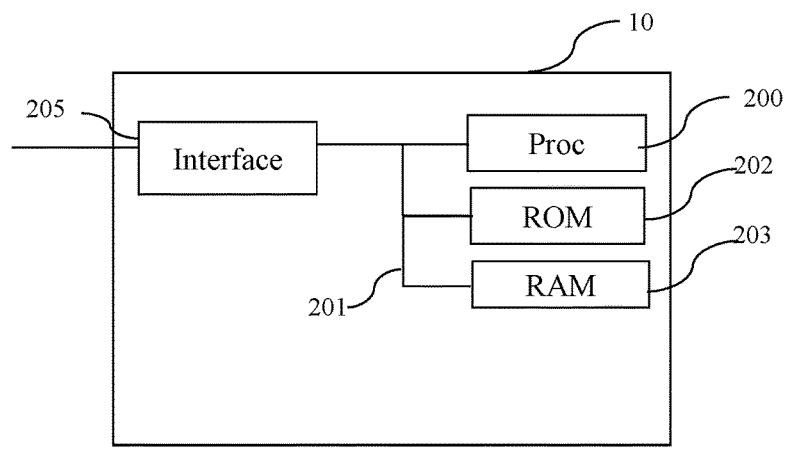
FIG. 2 shows an example of an architecture of a device for performing banking operations according to the present invention.

FIG. 2 shows an example of architecture of a device for performing banking operations according to the present invention.

The device for performing banking operations 10 comprises:

a processor, microprocessor, or microcontroller 200;
a volatile memory 203;
a non-volatile memory 202;
an interface 205;
a communication bus connecting the processor 200 to the ROM 203, to the RAM 203 and to the interface 205.

The processor 200 is capable of executing instructions loaded into the volatile memory 203 from the non-volatile memory 202. When the device for performing banking operations 10 is powered up, the processor 200 is capable of reading instructions from the volatile memory 203 and executing them. These instructions form a computer program that causes the implementation, by the processor 200, of all or part of the method described in relation to FIG. 8.

Figure 8:
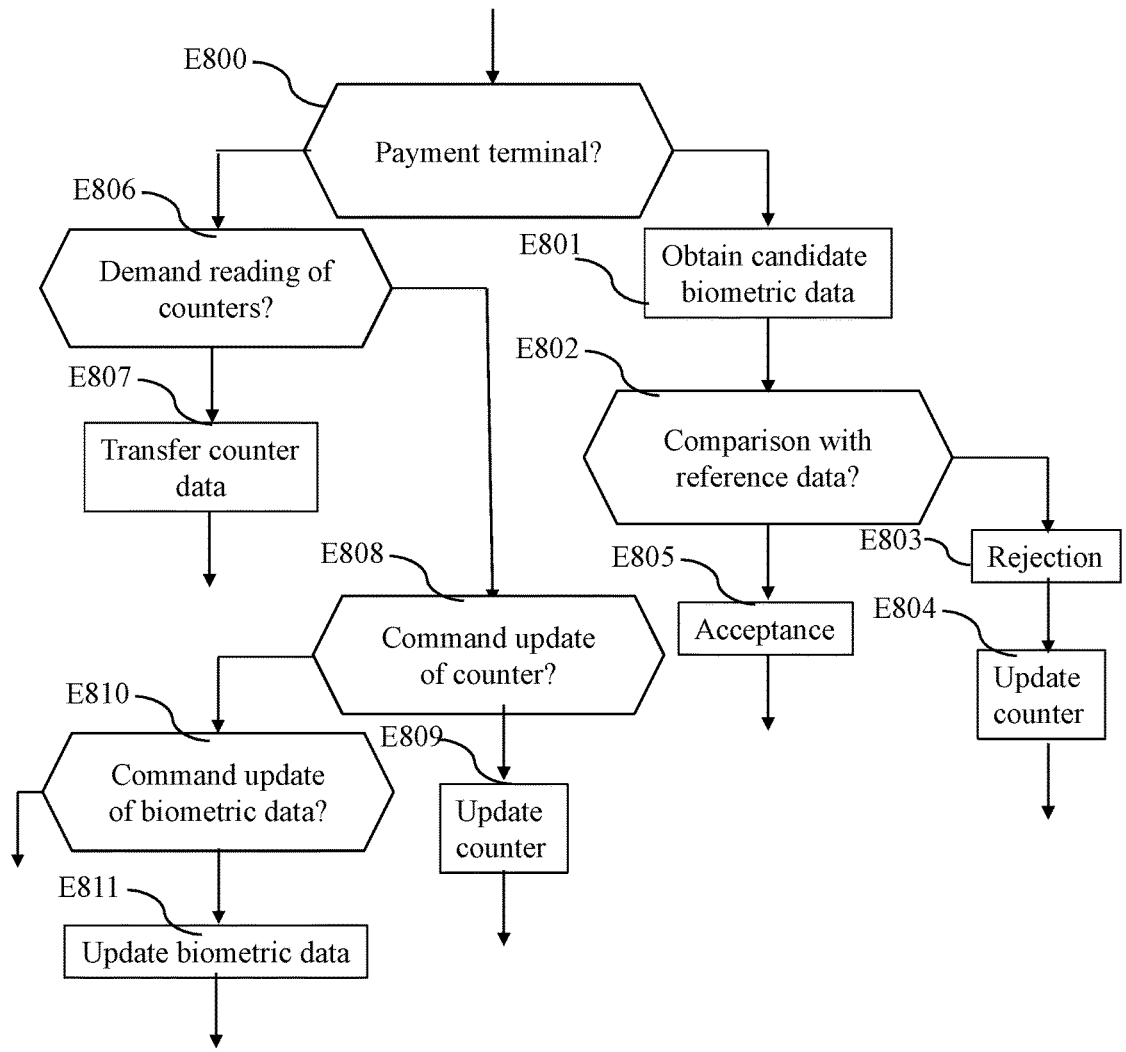
FIG. 8 shows an example of an algorithm executed by a device for performing banking operations according to the present invention.

All or part of the method described in relation to FIG. 8 can be implemented in software form by the execution of a set of instructions by a programmable machine, such as a DSP (digital signal processor) or a microcontroller or be implemented in hardware form by a machine or a dedicated component, such as an FPGA (field-programmable gate array) or an ASIC (application-specific integrated circuit).

The interface 205 is able to communicate with a personalisation device 20 and/or a payment terminal 30.

Figure 3:
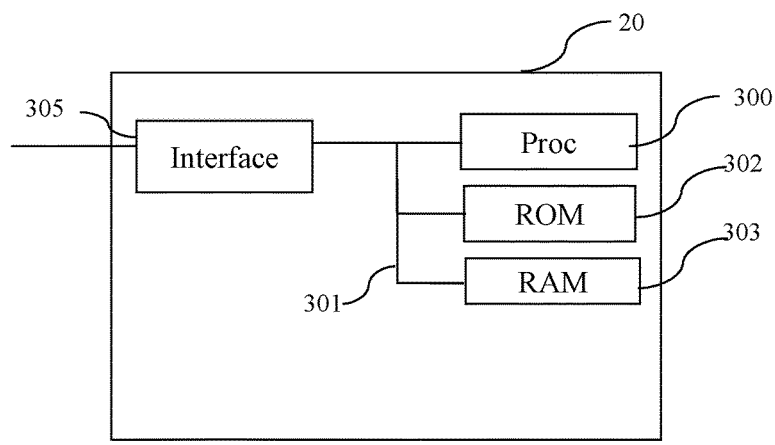
FIG. 3 shows an example of an architecture of a device for parameterising a device for performing banking operations according to the present invention.

FIG. 3 shows an example of architecture of a device for parameterising a device for performing banking operations according to the present invention.

The device 20 for parameterising a device for performing banking operations comprises:

a processor, microprocessor, or microcontroller 300;
a volatile memory 303;
a non-volatile memory 302;
an interface 305;
a communication bus connecting the processor 300 to the ROM 303, to the RAM 303 and to the interface 305.

The processor 300 is capable of executing instructions loaded into the volatile memory 303 from the non-volatile memory 302. When the device for performing banking operations 20 is powered up, the processor 300 is capable of reading instructions from the volatile memory 303 and executing them. These instructions form a computer program that causes the implementation, by the processor 300, of all or part of the method described in relation to FIGS. 5, 6 and 7.

Figure 5:
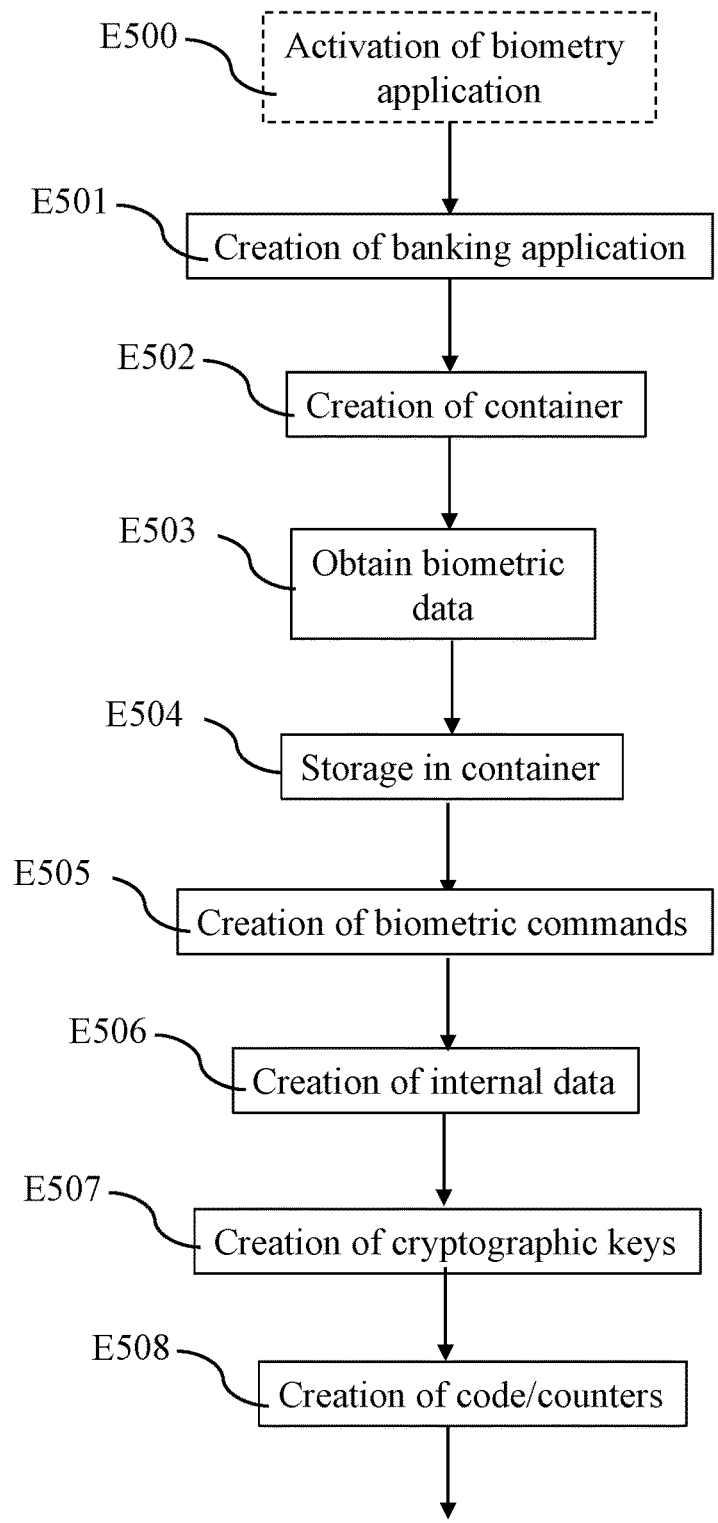
FIG. 5 shows an example of an algorithm executed by a device for parameterising a device for performing banking operations according to a first embodiment of the present invention.
Figure 6:
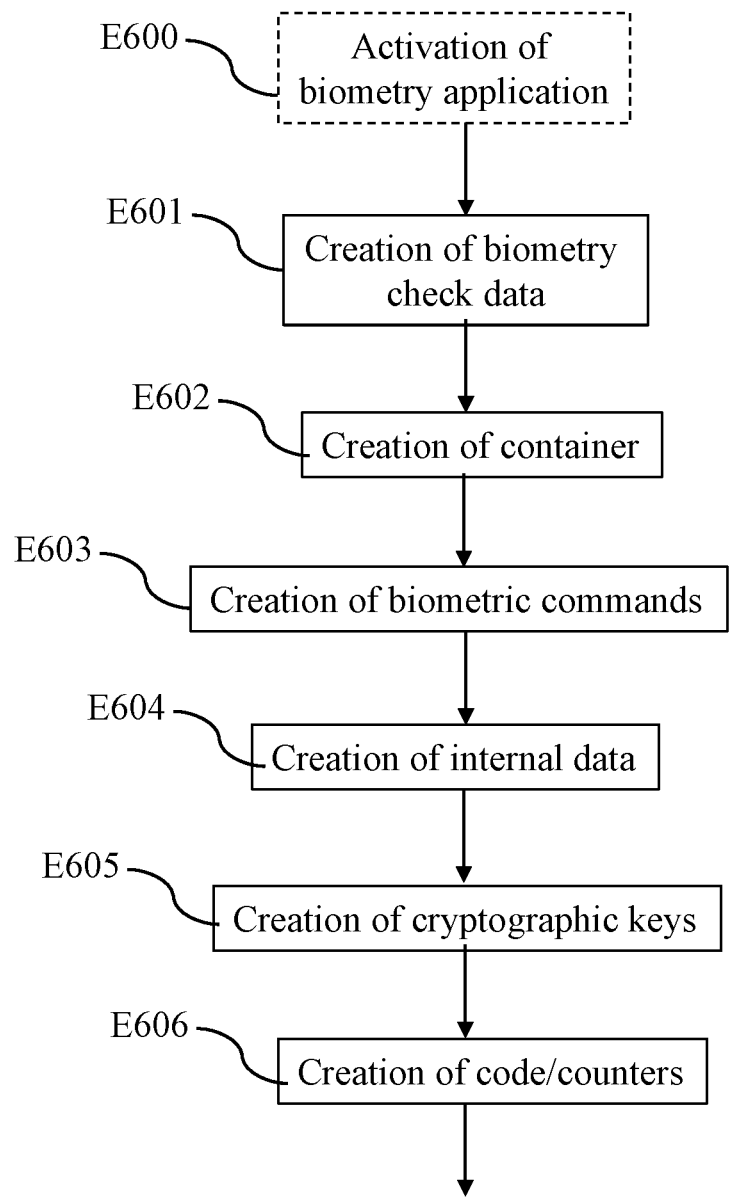
FIG. 6 shows an example of an algorithm executed by a device for parameterising a device for performing banking operations according to a second embodiment of the present invention.

All or part of the method described in relation to FIGS. 5, 6 and 7 can be implemented in software form by the execution of a set of instructions by a programmable machine, such as a DSP (digital signal processor) or a microcontroller, or be implemented in hardware form by a machine or a dedicated component, such as an FPGA (field-programmable gate array) or an ASIC (application-specific integrated circuit).

The interface 305 is able to communicate with a device for performing banking operations 10.

Figure 4:
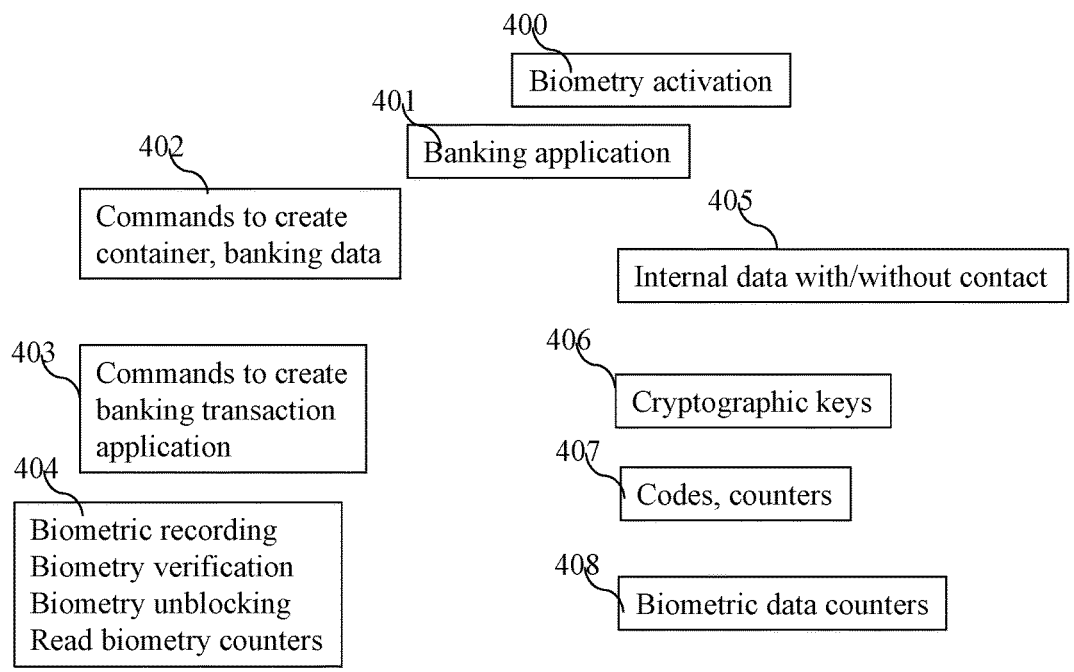
FIG. 4 shows an example of software modules implemented in the device for performing banking operations according to the present invention.

FIG. 4 shows an example of software modules implemented in the device for performing banking operations according to the present invention.

The device for performing banking operations 10 comprises a module 400 for activating the biometric function that is, according to the present invention, used for authorising or rejecting a banking transaction.

When the application for authenticating the bearer by at least the verification of biometric data is created, the module 400 for activating the biometric function sets a specific parameter to the value '1', which makes it possible to activate the whole of the solution used by the present invention. If this parameter is positioned at the zero value, then the device for performing banking operations behaves strictly as a device for performing conventional banking operations with authentication by code.

When the parameter is positioned at '1', then the functionality of authentication by biometric data is activated and it is then possible to parameterise the application for authenticating the bearer by at least the verification of biometric data.

The device for performing banking operations 10 comprises a banking application module 401. The banking application module 401 is created in the device for performing banking operations with a certain configuration that enables the corresponding executable code to be used.

The device for performing banking operations 10 comprises a module 402 for interpreting commands to create a container or memory area for storing reference biometric data used for authenticating the bearer or user of the device for performing banking operations 10.

Data identifiers are conventionally used in the prior art during phases of creating the banking transaction functionality of the device for performing banking operations. Conventionally, an identifier is sent to the device for performing banking operations 10 with the data that it identifies. This identifier is standardised.

Conventionally, some identifiers or ranges of identifiers are reserved by standards for identifying all the data the creation of which is necessary for the correct functioning of the application 401. These same standards specify a range of identifiers available and the present invention uses these identifiers left available, that is to say not associated with a predetermined command, for specifying the type of command and the data to which the commands refer.

The identifiers used by the present invention for implementing the authentication functionality by means of biometric data are the identifiers of the standard, such as for example the EMV standard, referred to as DGI identifiers, relating to banking transactions available for effecting commands not predefined by the standard.

The container is for example created from these identifiers.

The device for performing banking operations 10 comprises a module 403 for interpreting commands for creating the banking application. This module makes it possible to create the tree of the banking application, that is to say the data that the application will use during functioning thereof. These data are for example internal data, check data, cryptographic keys, a code, a code entry error counter and an associated limit value.

The device for performing banking operations 10 comprises a module 404 that comprises the various commands that can be implemented in the device for performing banking operations 10. The list of commands that can be implemented in the device for performing banking operations 10 comprises for example and non-limitatively the following commands: recording of biometric data after the supply of the device for performing banking operations to its user, verification of biometric data without enciphering, verification of biometric data with enciphering, unblocking of the error counter, reading of the error counter.

The device for performing banking operations 10 comprises a module 405 that comprises the internal data enabling the device for performing banking operations 10 to perform operations, as described with reference to the module 404, by means of the interface 205 with or without physical contact with a payment terminal 30.

The device for performing banking operations 10 comprises a module 406 able to manage the various cryptographic keys used for communicating via the interface 205.

The device for performing banking operations 10 comprises a module 407 that stores the authentication code as well as the various associated counters.

The device for performing banking operations 10 comprises a module 408 that manages the storage of the biometric data in a created biometric container.

FIG. 5 shows an example of an algorithm executed by a device for parameterising a device for performing banking operations according to a first embodiment of the present invention.

The present algorithm is described in an example where it is executed by the processor 300 of the device for parameterising a device for performing banking operations.

At step E500, the processor 300 activates the module for activating the biometry function 400 used for authorising or rejecting a banking transaction.

The processor 300 sets the specific parameter to the value '1' and thus makes it possible to activate the whole of the solution used by the present invention and allows activation of the module 501.

It should be noted here that, in a particular embodiment of the present invention, step E500 is not executed, activation of the module 501 being automatic.

At step E501, the processor 300 activates the banking application module 401 and the module 402. The banking application module 401 is created in the device for performing banking operations with a certain configuration that enables the corresponding executable code to be used.

At step E502, the processor 300 activates the module 403 allowing the creation of a container for storing reference biometric data used for authenticating the bearer of the device for performing banking operations 10.

At the following step E503, the processor 300 obtains, from a biometric database, or directly from a biometric capture device 40a, the biometric data of the future holder or user of the device for performing banking operations 10. The biometric data were for example communicated by the holder by means of a communication network or by means of a bank branch of the banking establishment.

At step E504, the processor 300 demands the storage of biometric data of the future holder of the device for performing banking operations 10 in the container created at step E502.

Steps E503 and E504 constitute an operation commonly referred to as enrollment.

At step E505, the processor 300 activates the module 404, which contains the various commands that can be implemented in the device for performing banking operations 10. The processor 300 activates or not the various following commands: verification of biometric data without enciphering, verification of biometric data with enciphering, unblocking of the error counter, reading of the error counter.

In a particular embodiment of the present invention, the command for recording biometric data after the supply of the device for performing banking operations to its holder is also activated.

At step E506, the processor 300 activates the module 403 that enables interpretation of commands for creating the banking application. This module makes it possible to create the tree of the banking application, that is to say the data that the application will use during functioning thereof. These data are for example internal data, cryptographic keys, a code, a code entry error counter and an associated limit value. At the same step, the processor 300 activates the module 405, which contains the internal data enabling the device for performing banking operations 10 to perform operations by means of the interface 205 with or without physical contact with a payment terminal 30.

At step E507, the processor 300 activates the module 406, which is able to manage the various cryptographic keys used for communicating via the interface 205.

At step E508, the processor 300 activates the module 407, which stores the authentication code as well as the various associated counters.

Once these operations are performed, the device for performing banking operations 10 is ready to be sent to its future holder for immediate use.

FIG. 6 shows an example of an algorithm executed by a device for parameterising a device for performing banking operations according to a second embodiment of the present invention.

The present algorithm is described in an example where it is executed by the processor 300 of the device for parameterising a device for performing banking operations.

At step E600, the processor 300 activates the module for activating the biometry function 400 used for authorising or rejecting a banking transaction.

The processor 300 sets the specific parameter to the value '1' and thus makes it possible to activate the whole of the solution used by the present invention and enables activation of the module 501.

It should be noted here that, in a particular embodiment of the present invention, step E500 is not executed, activation of the module 501 being automatic.

At step E601, the processor 300 activates the banking application module 401 and the module 402. The banking application module 401 is created in the device for performing banking operations with a certain configuration that enables the corresponding executable code to be used.

At step E602, the processor 300 activates the module 403 enabling the creation of a container for storing the reference biometric data used for authenticating the bearer of the device for performing banking operations 10.

At step E603, the processor 300 activates the module 404, which contains the various commands that can be implemented in the device for performing banking operations 10. The processor 300, on the basis of internal check data, activates or not the various following commands: recording of biometric data after the supply of the device for performing banking operations to its holder, verification of biometric data without enciphering, verification of biometric data with enciphering, unblocking of the error counter, reading of the error counter.

At step E604, the processor 300 activates the module 403, which enables interpretation of commands for creating the banking application. This module makes it possible to create the tree of the banking application, that is to say the data that the application will use during functioning thereof. These data are for example internal data, cryptographic keys, a code, a code entry error counter and an associated limit value. At the same step, the processor 300 activates the module 405, which contains the internal data enabling the device for performing banking operations 10 to perform operations by means of the interface 205 with or without physical contact with a payment terminal 30.

At step E605, the processor 300 activates the module 406, which is able to manage the various cryptographic keys used for communication via the interface 205.

At step E606, the processor 300 activates the module 407, which stores the authentication code and the various associated counters.

Once these operations have been performed, the device for performing banking operations 10 is ready to be sent to the future holder thereof. The holder, if he wishes to use the device for performing banking operations, must go to a bank branch in order to be able to proceed with a recording of his biometric data or supplies his biometric data so that they are stored in the device for performing banking operations 10.

Figure 7A:
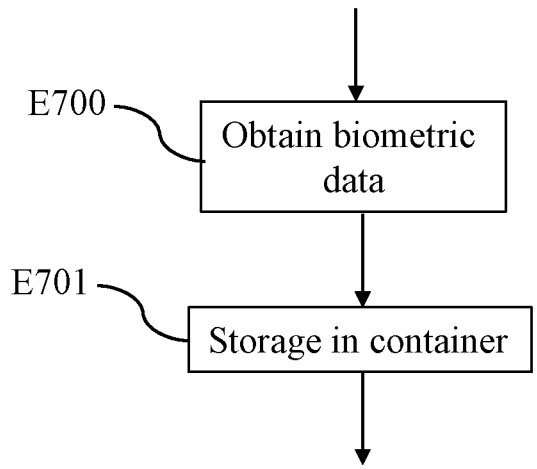
FIG. 7a shows an example of an algorithm executed by a device for parameterising a device for performing banking operations according to the second embodiment of the present invention.

FIG. 7a represents an example of an algorithm executed by a device for parameterising a device for performing banking operations according to the second embodiment of the present invention.

The present algorithm is described in an example where it is executed by the processor 300 of the device for parameterising a device for performing banking operations placed in a bank branch.

At the following step E700, the processor 300 obtains the biometric data of the future holder of the device for performing banking operations 10 by means of a biometric data capture device, for example when the card is personalised.

At step E701, the processor 300 commands the storage of the biometric data of the future holder of the device for performing banking operations 10 in the container created at step E602 of the algorithm in FIG. 6.

Steps E700 and E701 constitute an operation commonly referred to as enrollment.

Figure 7B:
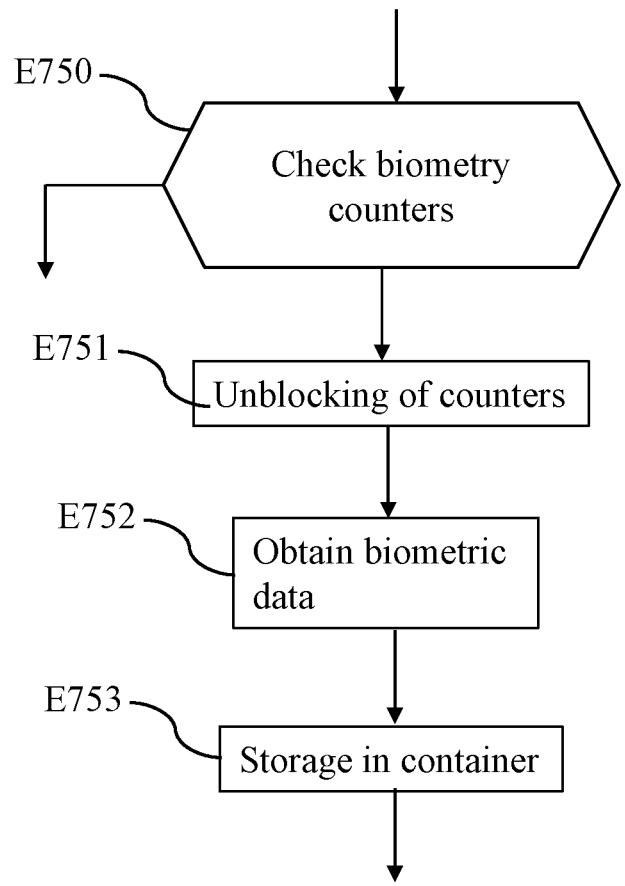
FIG. 7b shows an example of an algorithm executed by a device for parameterising a device for performing banking operations according to the present invention.

FIG. 7b shows an example of an algorithm executed by a device for parameterising a device for performing banking operations according to the present invention.

The present algorithm is described in an example where it is executed by the processor 300 of the device for parameterising a device for performing banking operations.

At step E750, the processor 300 commands the reading of the counter representing the various banking-transaction rejections related to a negative comparison between the reference biometric data stored in the device for performing banking operations and candidate data.

If the counters have a value below a maximum value, the processor 300 interrupts the present algorithm.

If the counters have a value higher than or equal to the maximum value, the processor 300 moves to step E751.

At step E751, the processor 300 commands the unblocking of the counters read by setting them to a zero value and interrupts the present algorithm.

In a particular embodiment, if the unblocking frequency of the counters is high, for example a monthly periodicity, the processor 300 moves from step E751 to E752.

At the following step E752, the processor 300 obtains the biometric data of the future holder of the device for performing banking operations 10 by means of a biometric data capture device.

At step E753, the processor 300 commands the storage of the biometric data obtained at step E752 in the container created at step E602 of the algorithm in FIG. 6 in place of the previously stored biometric data.

FIG. 8 shows an example of an algorithm executed by a device for performing banking operations according to the present invention.

The present algorithm is described in an example where it is executed by the processor 200 of the device for performing banking operations 10.

At step E800, the processor 200 checks whether the device for performing banking operations 10 receives a command from a payment terminal 30.

If so, the processor 200 moves to step E801. If not, the processor 200 moves to step E806.

At step E801, the processor 200 receives the candidate biometric data taken by a biometric data capture device associated with the payment terminal to which the device for performing banking operations 10 is connected.

At the following step E802, the processor 200 compares the candidate biometric data with the reference data stored in the container of the device for performing banking operations 10.

If the comparison of the candidate biometric data with the reference data stored in the container of the device for performing banking operations 10 is positive, the processor 200 moves to step E805. If not, the processor 200 moves to step E803.

At step E803, the processor 200 rejects the banking transaction.

At the following step E804, the processor 200 increments the counters representing the various banking transaction rejections relating to a negative comparison between the reference biometric data stored in the device for performing banking operations and the candidate data.

Once this operation has been performed, the processor 200 returns to step E800.

If the counters have a value greater than or equal to the maximum value, the processor 300 blocks the possibility of performing the banking transactions by means of the device for performing banking operations 10.

In a particular embodiment of the present invention, if the counters have a value greater than or equal to the maximum value, the processor 300 selects another method for authenticating the user of the device and, where applicable, for rejecting any banking operation as long as an updating of the rejection counter is not performed.

At step E805, the processor 200 accepts the banking transaction.

Once this operation has been performed, the processor 200 returns to step E800.

At step E806, the processor 200 checks whether a command to read the counters representing the various banking transaction rejections relating to a negative comparison between the reference biometric data stored in the device for performing banking operations and the candidate data is received.

If so, the processor 200 moves to step E806. If not the processor moves to step E808.

At step E807, the counters representing the various banking transaction rejections relating to a negative comparison between the reference biometric data stored in the device for performing banking operations and the candidate data are read.

Once this operation has been performed, the processor 200 returns to step E800.

At step E808, the processor 200 checks whether a command to update the counters representing the various banking-transaction rejections relating to a negative comparison between the reference biometric data stored in the device for performing banking operations and the candidate data is received.

If a command to update the counters representing the various banking transaction rejections relating to a negative comparison between the reference biometric data stored in the device for performing banking operations and the candidate data is received, the processor 200 moves to step E809. If not, the processor 200 moves to step E810.

At step E809, the counters representing the various banking transaction rejections relating to a negative comparison between the reference biometric data stored in the device for performing banking operations and the candidate data are updated.

Once this operation has been performed, the processor 200 returns to step E800.

At step E810, the processor 200 checks whether a command to update the reference biometric data stored in the device for performing banking operations and the candidate data is received.

If a command to update the reference biometric data stored in the device for performing banking operations and the candidate data is received, the processor 200 moves to step E811. If not, the processor 200 moves to step E800.

At step E811, new biometric data are stored in the container.

Once this operation has been performed, the processor 200 returns to step E800.

Naturally the present invention is in no way limited to the embodiments described here, but quite the contrary encompasses any variant within the capability of a person skilled in the art.

The invention claimed is:

1. A method incorporating a device for performing banking operation in which biometric data of a user of the device for performing banking operation are used to authenticate the user of the device for performing banking operation, wherein the method comprises:

activating, in the device for performing banking operation by a module for activating the biometric function implemented in the device for performing banking operation, a biometric data functionality for authenticating the user of the device for performing banking operation, the activating by the module for activating the biometric function being performed by setting a parameter to a first value and when the parameter is positioned at the first value, then functionality of authentication by biometric data is activated and it is then possible to parameterise the application for authenticating of a bearer by at least a verification of biometric data, and when the parameter is positioned at a second value that is different from the first value, the device for performing banking operation behaves as a device for performing banking operations where authentication is performed by using a candidate authentication code;

activating a plurality of commands, wherein a standard relates to the banking operation, wherein the standard has first identifiers or subsets of first identifiers reserved by the standard for identifying all data a creation of which is necessary for a correct functioning of a specific banking application, wherein the standard specifies a subset of second identifiers not already reserved and thus left available after the first identifiers of the subsets of the first identifies have been reserved by the standard, the identifiers used for activating the plurality of commands being identifiers of the subset of the second identifiers left available, creating in the device for performing the banking operation, a container able to store reference biometric data of the user of the device for performing the banking operation, storing reference biometric data in the container of reference biometric data of the user of the device for performing the banking operation.

2. The method according to claim 1, wherein the method further comprises the steps of:

receiving candidate biometric data for the banking operation, comparing the candidate biometric data with a reference biometric data, and authorising or rejecting the banking operation according to the comparison.

3. The method according to claim 1, wherein the method further comprises the step of storing, in the device for performing banking operations, instructions able to process at least one of the following commands: verification of biometric data without enciphering, verification of biometric data with enciphering, unblocking an error counter, reading an error counter.

4. The method according to claim 1, wherein the method further comprises the step of storing, in the device for performing banking operation, instructions able to process the recording of biometric data subsequently to the supply of the device for performing banking operation to the user of the device.

5. The method according to claim 1, wherein, in a case of rejection of the banking operation, the method further comprises a step of incrementing a rejection counter.

6. The method according to claim 5, wherein the method further comprises comparing the value of the rejection counter with a predetermined value and, if the value of the rejection counter is equal to the predetermined value, selecting another method for authenticating the user of the device and, where applicable, rejecting any banking operation as long as an updating of the rejection counter is not made.

7. The method according to claim 5, wherein, when the rejection counter is updated, the method further comprises a step of updating in the container new reference biometric data of the user of the device for performing banking operations.

8. The method according to claim 1, wherein, if biometric data functionality is not activated, the method comprises:

receiving the candidate authentication code for a banking operation, comparing the candidate authentication code for the banking operation with a reference code stored in the device for performing banking operation, and authorising or rejecting the banking operation according to the comparison of the candidate authentication code with the reference code.

9. A non-transitory information carrier storing a computer program thereon, said program containing instructions for implementing the method according to claim 1 when the instructions are loaded onto and executed by a computer system.

10. A device for performing banking operation in which biometric data of a user of the device for performing banking operation are used to authenticate the user of the device for performing banking operation, wherein the device comprises circuitry arranged for:

activating, in the device for performing banking operation by a module for activating the biometric function implemented in the device for performing banking operation, a biometric data functionality for authenticating the user of the device for performing banking operation, the activating by the module for activating the biometric function being performed by setting a parameter to a first value and when the parameter is positioned at the first value, then functionality of authentication by biometric data is activated and it is then possible to parameterise the application for authenticating of a bearer by at least a verification of biometric data, and when the parameter is positioned at a second value that is different from the first value, the device for performing banking operation behaves as a device for performing banking operations where authentication is performed by using a candidate authentication code;

creating, in the device for performing the banking operation, a container able to store reference biometric data of the user of the device for performing the banking operation, storing reference biometric data, in the container of reference biometric data of the user of the device for performing the banking operation.

11. A chip card comprising the device for performing banking operations according to claim 10.

* * * * *